United States Patent [19]

Giebmanns

[11] Patent Number: 4,991,358
[45] Date of Patent: Feb. 12, 1991

[54] GRINDING MACHINE

[75] Inventor: Karl H. Giebmanns, Westport, Conn.

[73] Assignee: International Tool Machines, Inc., Westport, Conn.

[21] Appl. No.: 432,654

[22] Filed: Nov. 7, 1989

[51] Int. Cl.[5] .................. B24B 55/02; B24B 55/04; B24B 5/00
[52] U.S. Cl. .................................. 51/267; 51/272; 51/95 R; 51/356
[58] Field of Search ............... 51/50 R, 48 R, 103 C, 51/5 R, 103 R, 103 WH, 266, 267, 272, 95 R, 356

[56] References Cited

U.S. PATENT DOCUMENTS

| | | | |
|---|---|---|---|
| 2,799,975 | 7/1957 | Ashenfelder | 51/267 X |
| 4,115,956 | 9/1978 | Huffman | 51/96 |
| 4,423,568 | 1/1984 | Gould | 51/267 X |
| 4,481,741 | 11/1984 | Bouladon | 51/266 X |

Primary Examiner—Frederick R. Schmidt
Assistant Examiner—Bruce P. Watson
Attorney, Agent, or Firm—Klein & Vibber

[57] ABSTRACT

An arrangement for protecting the slides of a machine tool in general and a creep feed grinding machine in particular against the corrosive and heat effects of the coolant medium for the machine. The machine includes two servo-motor driven slides which are movably mounted on a first base. A second slide is normally movably mounted on top of a first slide of the two slides. A first bushing is mounted in the second slide and a support column is reciprocally, vertically mounted in the first bushing. A machine tool, such as a motor-driven grinding wheel, is mounted on the first column. A second base is rigidly mounted on the first base. A bearing is mounted in the second base and a support shaft carrying a workpiece table is rotatably mounted about a vertical axis in the bearing. The second base has an opening and the support column extends through this opening. The interior diameter of the opening is larger than the exterior diameter of the support column. A mechanism for reciprocally vertically moving the support column is mounted on the second base. The support column is horizontally and vertically movable in the opening of the second base. A first cover surrounding the first bushing. A second bushing mounted in the opening and being surrounded by a second cover. The first cover has a vertical wall which extends up to the undersurface of the second cover. A cooling medium storage tank conducting cooling medium via a nozzle to the contact region between the grinding wheel and a workpiece mounted on the workpiece table. The first and second cover preventing the cooling medium from contacting the first and second slides.

10 Claims, 4 Drawing Sheets

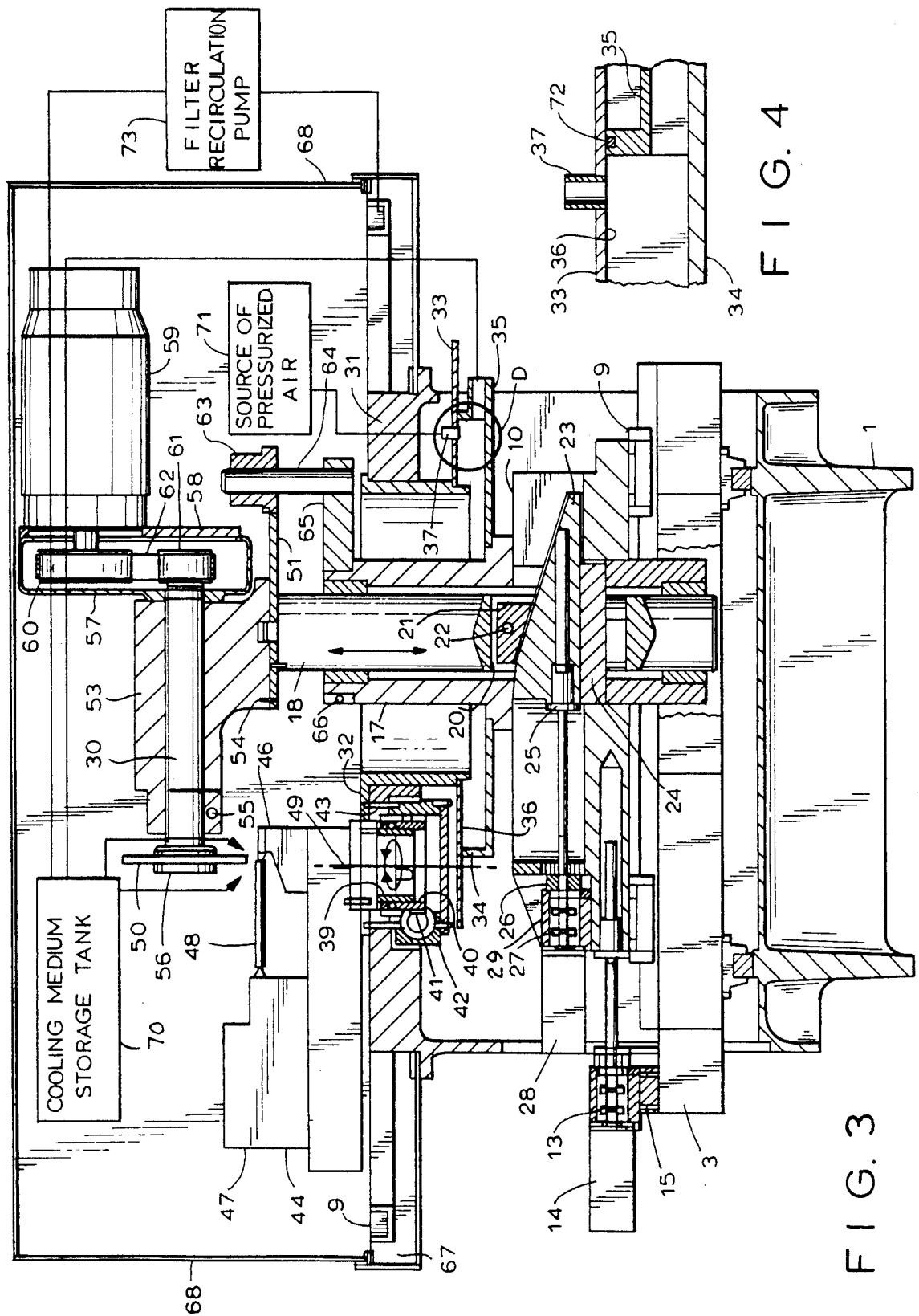

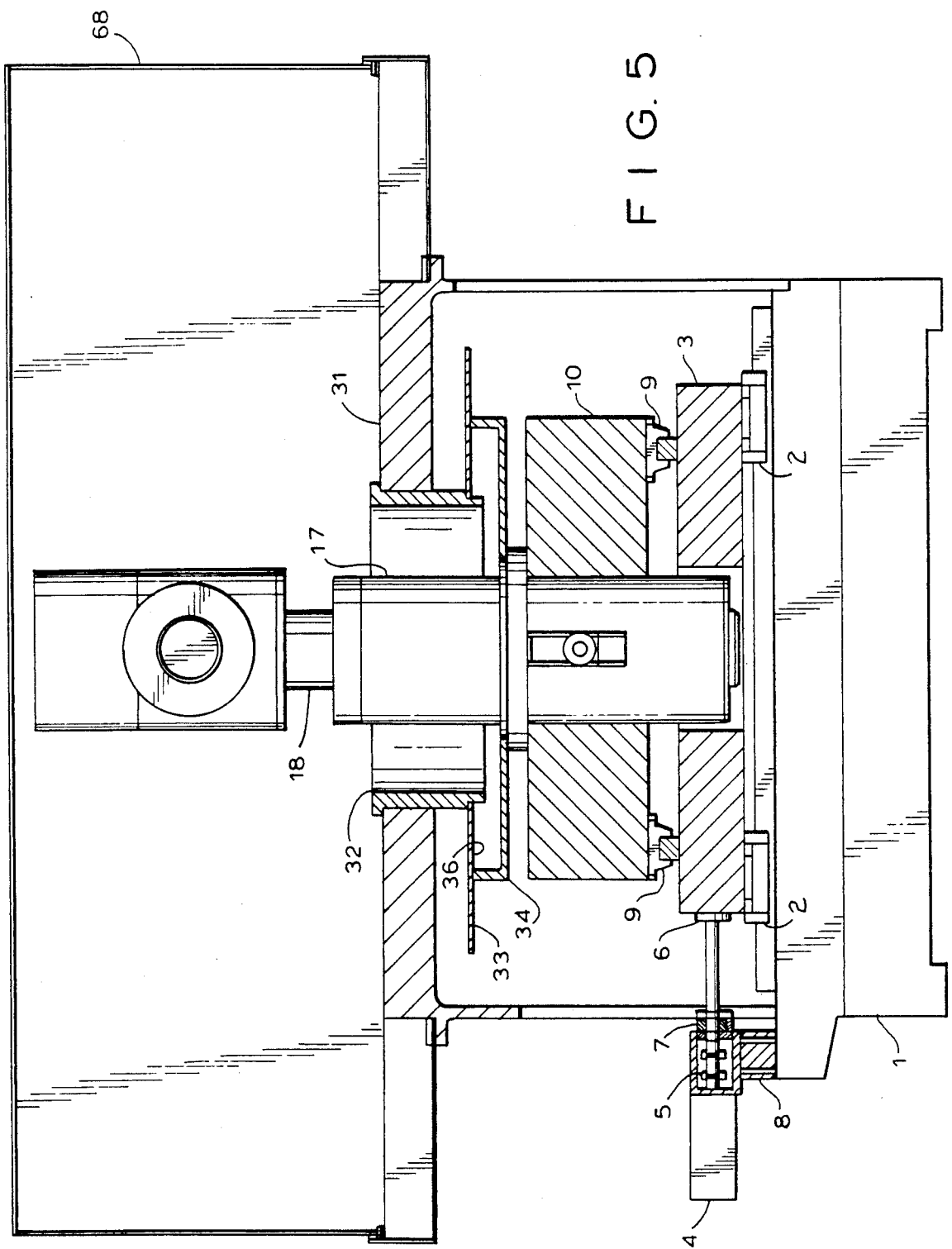

GRINDING MACHINE

FIELD OF INVENTION

This invention relates to a new grinding machine which includes an improved arrangement for cooling the heat generating region of a creep-feed grinding machine, in which region contact is made between the workpiece and the grinding wheel. In the state of the art grinding technology, creep feed grinding machines find an increased use because such machines are capable of removing large amounts of material in a rapid manner by means of modern state of the art grinding wheels. The advantage of grinding wheel machining versus wheel cutting tool machining (such as milling cutters, form cutters, etc.), resides in that the grinding wheel can be formed into almost any shape. With today's advanced technology of grinding wheel manufacture exotic materials, such as for example ceramics, can be machined. The creep feed grinding machines of the state of the art have to be very rigid and stiff in order to allow a grinding operation with high horse power which can perform deep cuts in one path. Furthermore, such a machine should have universal application to accomplish a variety of different grinding operations. When grinding different materials, different types of cooling operations are required to achieve an efficient operation. For example, for grinding hardened steel a cutting oil is usually used, wheereas for grinding carbide or other exotic materials a soluble water (soluble water means having corrosion-inhibiting additives) is used as a cooling medium. The use of soluble water has the disadvantage that such water, despite the use of corrosion-inhibiting additives, will eventually cause corrision of the very precisely machined slides and can in a relatively short period of time destroy the precision of the creep feed grinding machine. The creep feed grinding machines of the state of the art must meet very high standards of precision. The various moving parts of the machine are CNC controlled for incremental movements as small as 0.000005 inches. For ultimate precision such machines can be equipped with gauges measuring temperature changes and this data can be processed to automatically compensate for any thermal expansions of certain parts if predetermined limit values are exceeded.

BACKGROUND OF THE INVENTION

The instant invention relates to an improved cooling arrangement for a machine tool in general and a creep feed grinding machine in particular. Creep feed grinding machines form part of the state of the art. For example, a creep feed grinding machine of the type discussed herein is manufactured and marketed by International Tool Machines, Inc. of Westport, CT and the standard model designation of such a machine is ITM 3000.

Such a creep feed grinding machine may require performing high precision grinding operations. In such case it is of crucial importance to keep the major moving parts of the grinding machine at a constant temperature by means of a cooling medium (oil/water) for purposes of preventing such major moving parts of the grinding machine to change their dimensions due to temperature fluctuations. Since such grinding machines operate at their grinding region at high temperature the major machine components of the creep feed grinding machine may require adjustments during their operation which cannot be 100% controlled.

The grinding machines of the state of the art, whether they are of the creep feed grinding type or regular grinding type, are all designed so that, the major machine base supports on its top all slides, spindles, etc. If the machine operates with only a small amount of cooling medium it requires only a limited enclosed space around the grinding wheel. However, if large amounts of cooling medium are required or cooling is effected by means of a pressurized cooling medium being sprayed onto the grinding wheel, especially in creep feed grinding machines, the entire machine base is covered by means of a hood. Such a creep feed grinding machine is built to be rigid and such a machine is quite large because all slides must be evenly arranged on the top of the machine base in such a way that they do not interfere with each other during their operative movements. The machines of the state of the art generally include bellows covering the slides and ball screws for purposes of protecting them against contact with the cooling medium. In certain state of the art creep feed grinding machines covers are even provided with pressurized air to prevent the cooling medium from contacting and destroying the slides by way of corrosion. All these protective means for covering the moving parts of the machine cannot prevent a 100% protection against moisture, in particular, if soluble water is used as a cooling medium. It is, of course, understood that the arrangement of the invention can be used with machine tools other than creep feed grinding machines where contact of the cooling medium and the slides may detract from the operating precision of the machine tool.

SUMMARY OF THE INVENTION

It is therefore a general object of this invention to provide an improved protective arrangement preventing contact between the cooling medium and the moving slides of the machine. Since such an arrangement prevents contact between the cooling medium and the slides, a large increase of the heat energy and temperature of the cooling medium will not affect the precision of the grinding machine operation and therefore the temperature of the cooling medium does not require a vigorous control Also the usual temperature gauges for the slides of the machine can be reduced in number or dispensed with altogether. Similarly, the bellows for the slides and ball screws can be dispensed with.

In accordance with the aforedescribed object of the invention the major moving components of the creep feed grinding machine are completely protected from contact with the cooling medium and, therefore, the major slides and ball screws for driving each slide in the creep feed grinding machine of this invention do not come in contact with the cooling medium and therefore do not require the bellows, covers, etc. which are usually present in the state of the art machines.

According to the arrangement of the invention the major slides do not change their dimensions significantly due to increase in heat by way of contact with the cooling medium.

The novel arrangement of the invention therefore permits the creep feeding grinding machine to operate with a cooling oil or cooling soluble water without sacrificing the essential precision in the movements of the slides.

Moreover, the arrangement of the invention permits a compact construction of the creep feed grinding machine, which also reduces the overall manufacturing cost of the machine.

BRIEF DESCRIPTION OF THE DRAWINGS

With these and other objects in view, which will be apparent in the following detailed description, the present invention, which is shown by example only, will be clearly understood in connection with the accompanying drawing, in which:

FIG. 3 is an end elevational view partially in section of the machine illustrated in FIGS. 1 and 2;

FIG. 4 is a cross sectional view of Detail D in FIG. 3;

FIG. 5 is a side elevational view partially in cross-section of the machine illustrated in FIGS. 1-3.

DESCRIPTION OF PREFERRED EMBODIMENT

Figure 1:
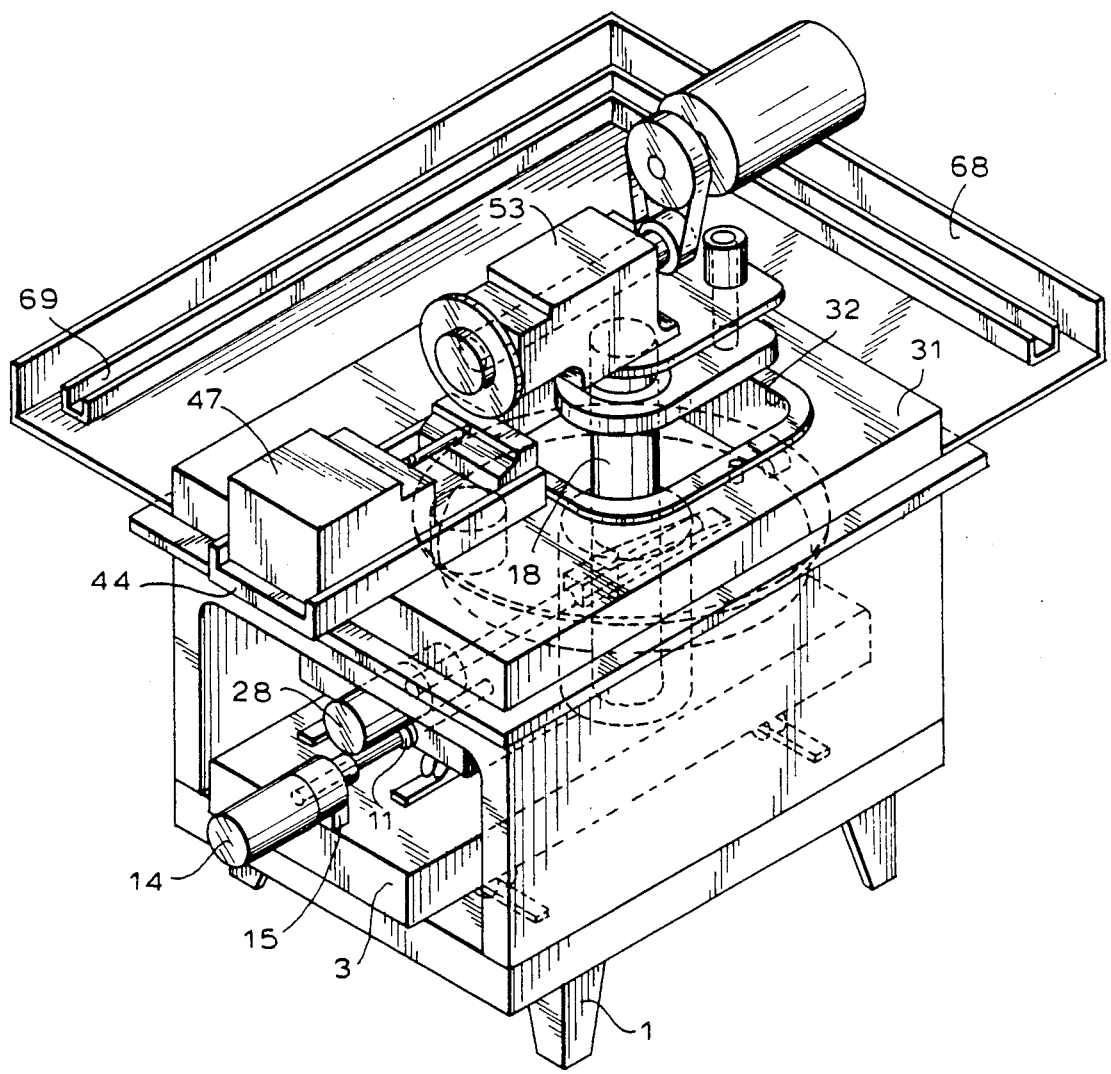
FIG. 1 is a perspective view of a creep feed grinding machine in accordance with this invention.
Figure 2:
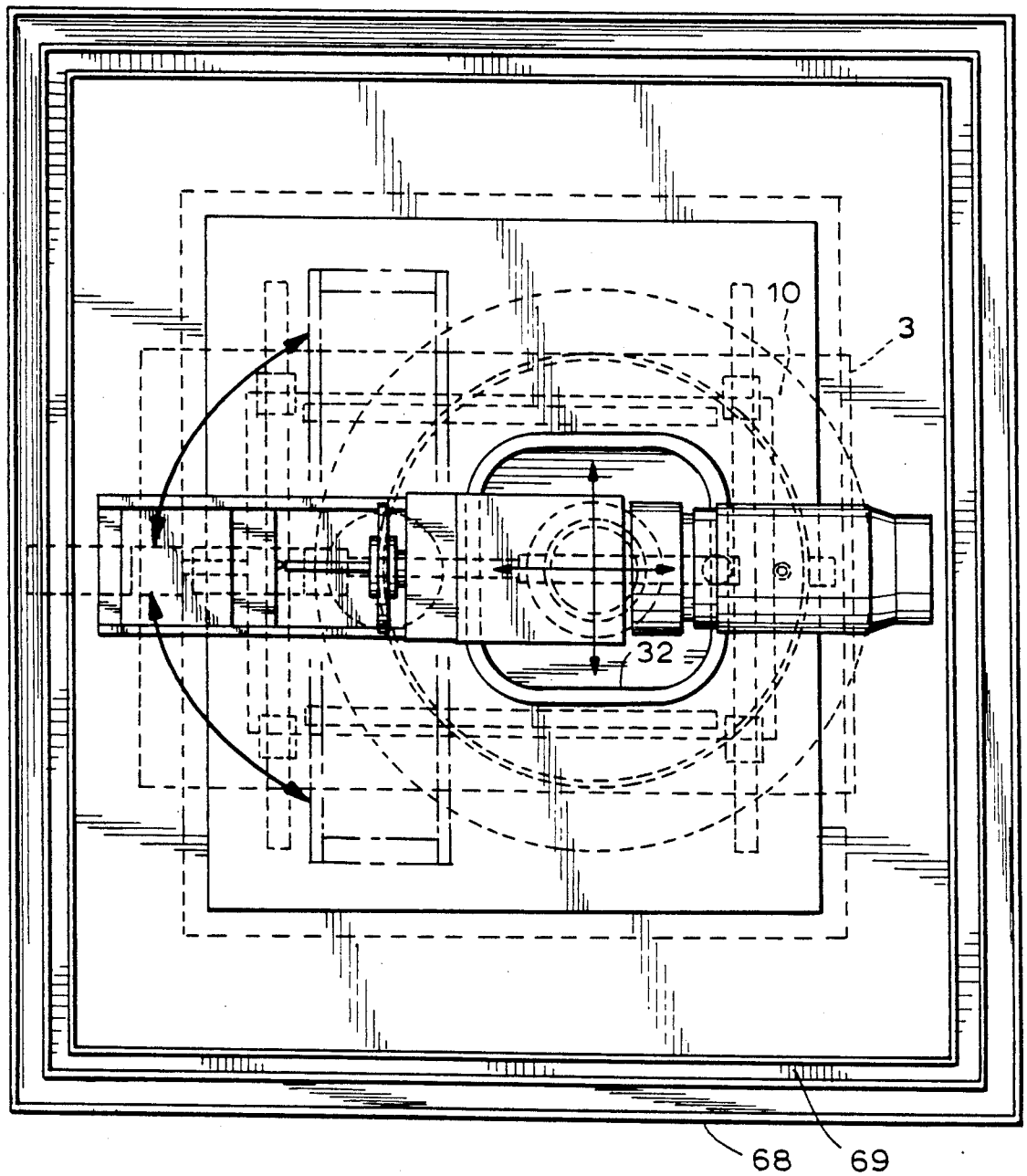
FIG. 2 is a plan view of the creep feed grinding machine of the invention.

Referring now to the drawing, there is illustrated a creep feed grinding machine having a machine base 1 on which a support plate 3 is slidably mounted via the slides 2. The support plate 3 is movable via a sero motor 4 having a coupling 5 for driving the ball screw 6 via a bearing 7. This motor 4 is rigidly mounted on a block 8 which is fixedly and rigidly supported on the base 1. The support plate 3 in turn supports a second slide block 10 via slides 9 so that the slide block 10 moves perpendicularly relative to the movement of the support plate 3. The second slide block 10 is also movable via a drive motor 14, coupling 13, and ball screw 11, as illustrated in FIG. 3. The drive motor 14 is mounted on a block 15 which is fixed to the support plate 3. The drive motors 4 and 14 are controlled by a CNC control unit so that their motion can be interpolated by way of moving slide blocks 3 and 10 which move in a horizontal plane, thereby the vertical column 18 can be reciprocated along the vertical axis Z and can also be simultaneously moved along a plane lying in the vertical axis Z to thereby perform an angular movement. The slide block 10 includes a guide bushing 17 in which the vertical column 18 is guidingly, reciprocally, slidably mounted. The vertical column 18 includes an internal slot 20 for accommodating therein a slide show 21 which is mounted on the column 18 by means of a pin 22. A wedge 23 is slidably mounted on a slide block 24 which is supported on the bushing 17. The wedge 23 is driven by means of a servo motor 28 via coupling 27 attached to a ball screw 25 which is held in a bearing 26, which bearing 26 is mounted in housing 29, which housing is supported on the slide block 10. The wedge 23 can be moved towards the right in FIG. 3, by means of the rotating ball screw 25 or it can be moved towards the left by the same ball screw 25, thereby moving respectively up or down column 18 along the vertical axis Z. The motor 28 can be controlled by the same CNC control unit which controls the motors 4 and 14. In this way the grinding spindle 30, mounted in the spindle housing 53, can be moved up or down and at any preselected angle by appropriately adjusting the drive of the motors 4, 14 and 28.

A second machine base 31 is supported on the machine base 1 (see FIG. 3). This machine base 31 includes a vertical wall 68 by means of which most of the moving slides 3 and 10 and the members mounted thereon are enclosed. The machine base 31 includes a bushing 32 which defines a sufficiently large opening to permit the horizontal movements engendered by the slides 3 and 10 and the vertical movement engendered by the wedge 23. Thus the machine is designed so that no contact occurs between the bushing 17 and 32. A stop plate 33 is mounted in a recess of the bushing 32 and is rigidly connected thereto. This stop plate 33 includes a coolant catch 34 having an outlet pipe 35. The coolant catch 34 has a vertical wall portion 34' in which an O-ring is mounted so as to insure a seal between the stop plate 33 and the vertical wall 34' during the relative movement between those two parts.

The novel arrangement of the machine operates as follows:

A storage tank 70 for the cooling medium is mounted on base 31 and feeds coolant medium through a pair of nozzles (see the pair of arrows in FIG. 3) towards the region where contact between the grinding wheel 50 and the work piece 48 occurs. Such coolant medium can be stored, for example, in a 30 gallon tank and be sprayed into the contact region at a pressure of 30 psi. The outlet 35 returns the cooling medium which is collected in the coolant catch 34 to the storage tank 70 by way of a non-illustrated recirculation pump and filter 73. In order to prevent the leaking out of large amounts of cooling medium between the O-ring 72 and the underside 36 of the stop plate 33 a source of pressurized air 71 feeds air under pressure of up to 100 psi through the air pressure inlet 37 into the chamber defined by the coolant medium catch 34 and stop plate 33. Thus an air cushion is built up inside the chamber to prevent any escape of fluid through the seal defined by the O-ring 72 and the underside 36. The machine base 31 includes a support for a pivotal movement about the axis U (49). The pivot axis 49 is formed by means of a bearing 40 which is operatively connected to a worm gear drive 41 to permit a preselected pivotal movement of at least 90°. The entire worm gear drive mechanism 41, 40 is mounted in a self-contained housing 42 which is mounted in the second machine base 31 by means of mounting bolts or screws 43. This manner of mounting on the second machine base 31 permits an easy disassembly or exchange of the entire drive mechanism 41, 40. Inside the bearing 40 there is mounted a shaft 39 which supports a table 44 which is fixedly mounted on the pivot shaft 39 by means of mounting bolts 45. This table 44 can be equipped with a center 46 and a drive head 47 for purposes of holding a work piece 48 therebetween. The work piece 48 when so held is then machined by means of the grinding wheel 50. The aforedescribed arrangement provides for a rotating about the axis 49 of the pivot shaft 39 so that the work piece 48 can be presented in different angular positions relative to the grinding wheel 50.

The grinding wheel drive comprises an adapter plate 51 which is fixedly mounted on the column 18 by means of threaded bolts 52. The adapter plate 51 supports the massive spindle housing 53 which is fixedly mounted thereon by means of threaded bolts 54. The spindle housing 53 includes a rotatable grinding spindle 30 which is clampingly held therein by means of clamping screws 55 in a conventional manner. The spindle 30 includes a standard wheel holder 56 on which a grinding wheel 50 is coaxially mounted. The housing 57 for a grinding wheel motor 59 is rigidly mounted via an adapter plate 58 on the spindle housing 53 as shown in FIG. 3. A drive pulley 60, mounted on the shaft of the motor 59, is drivingly connected to the drive pulley 61 of the grinding spindle 30 by means of a drive belt 62. In this fashion the drive servo motor 59 can rotate the grinding spindle 30 via the driving belt 62. The adapter plate 51 also supports a bushing 63 in which a shaft 64 is guided. The shaft 64 is clamped onto a clamp plate 65 which is attached to the bushing 17 by means of a clamp screw 66. By means of this arrangement the spindle housing 53 is prevented from rotating relative to the bushing 17 by removing the shaft 64 a rotation of the spindle housing 53 relative to the bushing 17 is possible. The entire top portion of the second machine base 31 is enclosed in a coolant medium pan 67 and an enclosure 68 to prevent the coolant medium from spraying coolant medium outside of the grinding wheel contact region. A coolant medium collective trough 69 surrounds the base plate 31 for collecting and recirculating the coolant medium via the filter and recirculating pump 73.

Although the invention is described and illustrated with reference to a plurality of embodiments thereof, it is expressly understood that it is in no way limited to the disclosure of such preferred embodiments but is capable of numerous modifications within the scope of the appended claims.

I claim:

1. An improved machine tool having a first base, a first slide linearly slidably movably mounted on said first base, a second slide linearly slidably movably mounted on said first slide, first bushing means are rigidly mounted on said second slide, a support column is reciprocally slidably mounted in said first bushing means for a preselected reciprocal vertical slidable movement therein, machine tool means operatively mounted on said column, driving means operatively connected to said machine tool means, a second base is rigidly mounted on said first base, a bearing is rotatably mounted in said second base, a support shaft is rotatably mounted in said bearing, a workpiece holding table is fixedly mounted on said support shaft for rotation about a vertical axis, workpiece holding means are operatively mounted on said table so as to hold a workpiece for operative contact with said machine tool means, second bushing means are mounted on said second base, said first bushing and support column extending through said second bushing means, the interior diameter of said second bushing means being substantially larger than the exterior diameter of said first bushing means to thereby permit lateral movements of said first bushing within said second bushing; first cover means fixedly mounted on said first bushing so as to surround it, second cover means having an undersurface and being fixedly mounted on said second bushing above said first cover means, vertical wall means extending upwardly from said first cover means toward abutting contact with the underside of said second cover means, coolant medium storage means operatively mounted in said machine tool, coolant medium dispensing for dispensing a coolant medium toward the region of said machine tool where said machine tool means makes contact with said workpiece, a substantial portion of said coolant medium being collected between said first and second over means after cooling the contact region between said machine tool means and workpiece, said first and second cover means preventing contact between the coolant medium and said first and second slides.

2. The improved machine tool as defined in claim 1, wherein said machine tool means include a grinding wheel and said machine tool is a grinding machine.

3. The improved machine tool as defined in claim 2, including first outlet means operatively mounted on said first cover means for permitting the outflow of said coolant medium which has been collected between said first and second cover means.

4. The improved machine tool as defined in claim 3, including recirculation means being operatively connected to said first outlet means and coolant medium storage means for recirculating said coolant mediums.

5. The improved machine tool as defined in claim 3, including third cover means removably mounted on said second base and selectively enclosing said workpiece holding table; said coolant medium dispensing means, and said machine tool means; whereby said coolant medium exiting from said coolant medium dispensing means is retained within the third cover means so that a portion thereof can pass through said second bushing and be collected between said first and second cover means and recirculated through said first outlet means to said coolant medium storage means, said second base and third cover means also preventing contact between said coolant medium and said first and second slides.

6. The improved machine tool as defined in claim 5, including coolant medium collecting channel means on said second base extending along the line of contact between said second base and said third cover means, second outlet means communicating, on the one hand, with said coolant medium collecting channel means and, on the other hand, with said recirculation means.

7. The improved machine tool as defined in claim 6, including filter means operatively mounted in said recirculation means for filtering out any contaminations from the coolant medium.

8. The improved machine tool as defined in claim 1, including O-ring means mounted on the free end of said vertical wall means to provide an improved sealing action between the underside of said second cover means and the vertical wall means said first cover means during the movement of said first cover means relative to said second cover means.

9. The improved machine tool as defined in claim 8, including an air pressure inlet mounted on said second cover means, and an air pressure source operatively connected to said air pressure inlet for introducing from above pressurized air between said first and second cover means to improve the sealing action between said O-ring means and the underside of said second cover means.

10. The improved machine tool as defined in claim 1, wherein said machine tool means is rigidly mounted on a support plate which is in turn rigidly mounted on top of the support column, a plate rigidly mounted on top of said first bushing means, said support plate and said plate having axially aligned bores, and a shaft extending through said axially bores to prevent an angular movement of said machine tool means relative to said first bushing means.

* * * * *